US012319051B2

(12) United States Patent
Verhoeven

(10) Patent No.: US 12,319,051 B2
(45) Date of Patent: Jun. 3, 2025

(54) SCANNING INKJET PRINTER WITH LOW FRICTION TRANSPORT BELT

(71) Applicant: CANON KABUSHIKI KAISHA, Tokyo (JP)

(72) Inventor: Erik P. J. Verhoeven, Hertogenbosch (NL)

(73) Assignee: Canon Kabushiki Kaisha, Tokyo (JP)

( * ) Notice: Subject to any disclaimer, the term of this patent is extended or adjusted under 35 U.S.C. 154(b) by 210 days.

(21) Appl. No.: 18/147,594

(22) Filed: Dec. 28, 2022

(65) Prior Publication Data

US 2023/0286297 A1 Sep. 14, 2023

(30) Foreign Application Priority Data

Mar. 11, 2022 (EP) .................................... 22161659

(51) Int. Cl.
*B41J 11/00* (2006.01)
*B65H 5/22* (2006.01)

(52) U.S. Cl.
CPC .......... *B41J 11/007* (2013.01); *B41J 11/0085* (2013.01); *B65H 5/224* (2013.01); *B65H 2402/10* (2013.01); *B65H 2406/3124* (2013.01); *B65H 2406/3223* (2013.01)

(58) Field of Classification Search
CPC ..... B41J 11/007; B41J 11/0085; B65H 5/224; B65H 2406/3124; B65H 2406/3223
See application file for complete search history.

(56) References Cited

U.S. PATENT DOCUMENTS

| | | | | |
|---|---|---|---|---|
| 2011/0122211 | A1* | 5/2011 | Ikeda | B41J 11/0085 347/104 |
| 2011/0253763 | A1 | 10/2011 | Toya | |
| 2020/0324558 | A1 | 10/2020 | Herrmann et al. | |
| 2022/0379630 | A1* | 12/2022 | Schulkes | B65G 15/32 |

FOREIGN PATENT DOCUMENTS

| | | | | |
|---|---|---|---|---|
| EP | 0773177 | A2 | | 5/1997 |
| EP | 2123466 | A1 | | 11/2009 |
| JP | 2016144880 | A | * | 8/2016 |
| NL | 2023115 | B1 | * | 12/2020 |
| WO | 2011064226 | A1 | | 6/2011 |

* cited by examiner

*Primary Examiner* — Sharon Polk
(74) *Attorney, Agent, or Firm* — Canon U.S.A., Inc. I.P. Division

(57) ABSTRACT

A printer includes a transport belt and a suction box. The suction box is in fluid connection with a suction source to apply an underpressure to a print medium on the transport belt. The suction box is provided with a plurality of protrusions having free ends that define a support plane for the transport belt and are provided with inlet openings. The transport belt is air permeable and endless, is provided over the suction box, and is provided with an inner channel structure which connects outer openings on an outer side of the transport belt to inner openings on an inner side of the transport belt. The inner openings are positioned to align with the inlet openings, and the inner channel structure widens from the inner openings to the outer openings.

12 Claims, 3 Drawing Sheets

SCANNING INKJET PRINTER WITH LOW FRICTION TRANSPORT BELT

BACKGROUND

Field

The disclosure relates to a printer, specifically a scanning inkjet printer for large format graphics.

Background

It is known to provide large format scanning inkjet printers with a belt-based transportation device. Such a printer may comprise an air permeable, endless transport belt provided over a suction box in fluid connection with a suction source to apply an underpressure to a print medium on the belt. Due to the size of the applied print media, the belt generally has a significant width, for example over 2 or 2.5 meters. The print medium is transported stepwise to allow for swath wise printing of an image in between steps. The print medium has to be displaced controllably to accurately position the print medium with respect to the scanning printhead assembly to avoid artifacts in the printed image. The relatively large dimensions of the belt result in relatively large friction forces, which can negatively affect the control of the belt. This may be overcome by using more powerful drives and stronger materials, but this increases the total costs of the printer.

SUMMARY

The disclosed printer provides an alternative belt transport device for a printer, preferably one which allows for cheaper or lighter construction of the belt transport device.

According to an aspect of the present disclosure, a printer includes a transport belt that is air permeable and endless, further defining a transport direction, and a suction box configured to be in fluid connection with a suction source to apply an underpressure to a print medium on the transport belt, wherein the suction box is provided with a plurality of protrusions having free ends that define a support plane for the transport belt and are provided with inlet openings, wherein the transport belt is provided over the suction box and provided with an inner channel structure which connects outer openings on an outer side of the transport belt to inner openings on an inner side of the transport belt, and wherein the inner openings are positioned to align with the inlet openings, and the inner channel structure widens from the inner openings to the outer openings in a lateral direction perpendicular to the transport direction.

It is the insight of the inventor that the friction between the belt and the suction box is proportional to a normal force, which normal force is due to due the underpressure applied to the belt. The inventor noted that the normal force was proportional to the total open area on the inner surface of the belt. This total open area can be reduced by using a channel structure, which allows for small openings on the inner side of the belt and large openings on the outward facing side of the belt. In consequence the normal force and thus the friction are reduced. Additionally, the friction is further reduced since the total contact area between the belt and the suction box is reduced, since the belt is supported on the protrusions. The inlet openings are provided at the tops of the protrusions during use to allow the underpressure to travel from the suction box through the belt to the print medium. This results in a low friction construction, which allows for the use of relatively light and/or low-costs materials, while ensuring accurate print media positioning. Thereby the printer of the present disclosure has been achieved.

More specific optional features of the disclosure are indicated in the dependent claims.

In an embodiment, the channel structure widens such that its cross-sectional (open) area at the inner side of the belt is smaller than its cross-sectional (open) area at the outer side of the belt. The widening may be gradual or in steps.

In an embodiment, the combined open area of the inner openings is substantially smaller than that of the outer openings. The outer open area of the belt is due to openings in the print surface of the belt. These openings may be formed by through-holes or perforations in the print surface. The total area of these outer openings together is greater than the total area of all inner openings combined. The channel structure may be structured, such that an inner opening connects only to specific one or more outer openings (or vice versa). In the latter case, the total area of the one or more outer openings in fluid connection with the one or more inner openings is greater than that of the one or more inner openings. Preferably the ratio of total area of the outer openings and to that of the inner openings is at least 10:1, very preferably at least 20:1, and even more preferably 50:1.

In an embodiment, each inner opening is dimensioned corresponding to the inlet opening over which it extends. Preferably a width of the inner openings corresponds to that of the inlet openings. The widths are similar, such that the inlet openings and inner openings overlap, and do not extend substantially beyond one another in a lateral direction perpendicular to a transport direction of the belt. It is preferred that the widths do not differ more than 20%, preferably, no more than 10%.

In an embodiment, the protrusions extend in a transport direction of the belt and are spaced apart from one another in a lateral direction of the belt perpendicular to the transport direction. The protrusion extends preferably continuously in the transport direction, forming parallel lines of raised ridges or steps on the suction box. The length of the protrusions in the transport direction is significantly greater than their width, preferably at least by a factor of 10, very preferably at least a factor of 25, and even more very preferably at least a factor of 50. Aligning the protrusions in the transport direction reduces friction and prevents lateral shifting of the belt during use.

In an embodiment, the inlet openings extend in a transport direction of the belt, wherein the length of inlet openings forming a single row in the transport direction is greater than their width. Each row forms a long, preferably continuous opening for a connection to an inner opening of the belt. Regardless of their position in the lateral direction, the inner openings are provided with an underpressure via the inlet openings. This ensures a continuous and constant holding of the print medium. An inlet opening on a single protrusion may be a single longitudinal opening or a long row of smaller, adjacent openings.

In an embodiment, a spacing between neighboring protrusions is greater than a width of the protrusions in the lateral direction. The protrusions are relatively far apart from one another. This reduces the contact area between the belt and the suction box, further reducing friction. Preferably, the spacing between neighboring protrusions is at least 10 times their width in the transport direction.

In embodiment, the inlet openings of the protrusions connect to a main chamber of the suction box, which main chamber is positioned below the protrusions during use. The main chamber distributes the underpressure in the lateral direction to the different protrusions. The suction box may be divided into multiple such main chambers, each of which is connected to a subset of the protrusions. The one or more main chambers preferably have a (combined) width similar to that of the print surface. By positioning the one or more main chambers below the protrusions, empty spaces are formed under the belt between the protrusions.

In an embodiment, a free space is formed between neighboring protrusions in the lateral direction and underneath the belt a height direction perpendicular to the transport and lateral directions. A substantial and/or major portion of the print surface of the belt is positioned over empty areas in between protrusions.

In an embodiment, the belt is a modular belt comprising a plurality of interlocking segments. A modular belt allows for a relatively cheap and simple means to form the channel structure in the belt. The segments may be formed e.g. of injection molded plastic parts. Preferably each segment is identical and the segments can be attached together in a pivotable manner to allow the belt to locally curve.

In an embodiment, each segment is formed of two parts, one comprising an outer opening and the other comprising an inner opening, and wherein the channel structure is formed as a chamber between the outer and inner openings when the parts are in their assembled state. A top part preferably comprises the print surface with the outer openings, while a bottom part comprises the widening channel structure. This allows both parts to be formed by e.g. injection molding. By mounting the parts together, a segment with an inner channel structure can be easily obtained.

Further scope of applicability of the present disclosure will become apparent from the detailed description given hereinafter. However, it should be understood that the detailed description and specific examples, while indicating preferred embodiments of the present disclosure, are given by way of illustration only, since various changes and modifications within the spirit and scope of the present disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure, and wherein.

DESCRIPTION OF THE EMBODIMENTS

Figure 1:
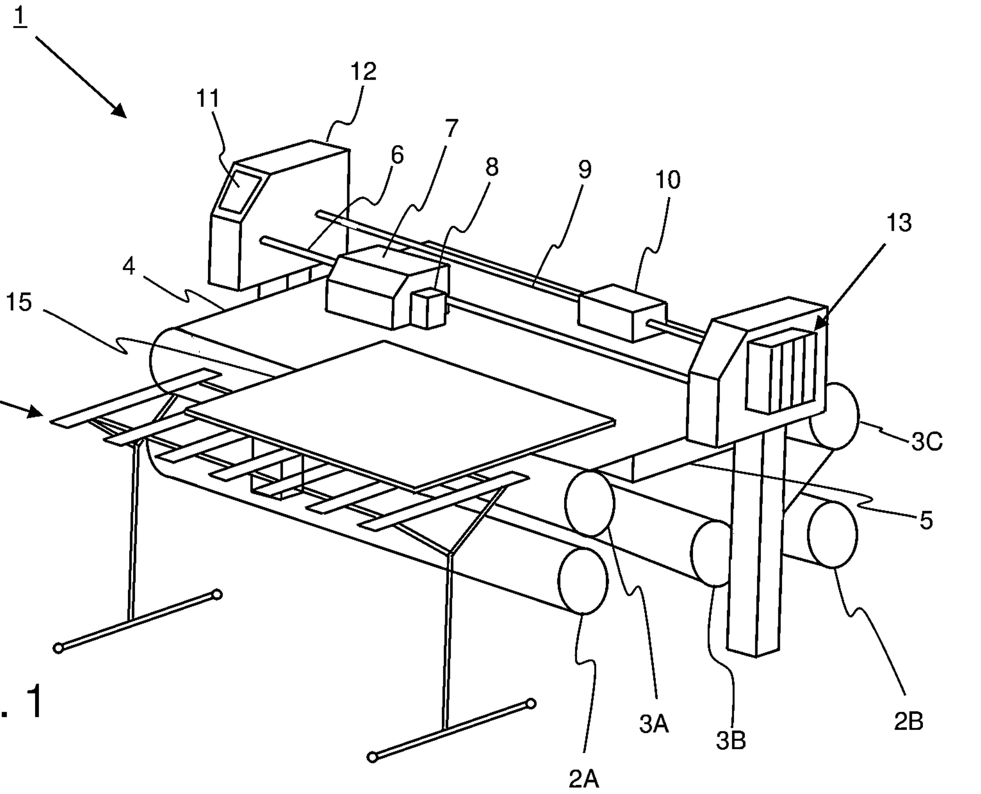
FIG. 1 is a schematic perspective view of a printing system according to the present disclosure in a first printing mode.

The present disclosure will now be described with reference to the accompanying drawings, wherein the same reference numerals have been used to identify the same or similar elements throughout the several views.

Printing System

FIG. 1 shows a wide format inkjet printer 1. The wide-format printer 1 comprises an inkjet printing assembly 7 for printing on a print medium 15, 16. The print medium 15, 16 in FIG. 1 is a relatively rigid substrate, such as a panel. The print medium 15, 16 is supplied from a media input unit 14, which may be configured for storing a plurality of such print media 15, 16 and supplying these to the printer 1. The printer 1 comprises transport means for receiving and transporting the print medium 15, 16 along the inkjet printing assembly 7. In FIG. 1, the transport means comprise an endless transport belt 4 supported on a plurality of support rollers 3A, 3B, 3C. At least one of the support rollers 3A, 3B, 3C is provided with driving means for moving the belt 4. Additionally, one or more one of the support rollers 3A, 3B, 3C may be configured to be moved and/or tilted to adjust and control the lateral position of the belt 4. The inkjet printing assembly 7 may be provided with a sensor 8, such as a CCD camera, to determine the relative position of belt 4 and/or the print medium 15, 16. Data from the sensor 8 may be applied to control the position of the belt 4 and/or the print medium 15, 16. The belt 4 is further provided with through-holes and a suction box 5 in connection with a suction source (not shown), such that an underpressure may be applied to the print medium 15, 16 via the through-holes in the belt 4. The underpressure adheres the print medium 15, 16 flatly to the belt 4 and prevents displacement of the print medium 15, 16 with respect to the belt 4. Due to this holding the belt 4 is able to transport the print medium 15, 16. It will be appreciated that other suitable transport means, such as rollers, steppers, etc. may alternatively be applied. The print medium 15, 16 may be transported stepwise and/or in continuous movement.

The inkjet printing assembly 7 is configured to translate along a first guide beam 6 in a scanning direction. The scanning direction is perpendicular to the direction in which the print medium is transported by the belt 4. The inkjet printing assembly 7 holds a plurality of print heads (not shown), which are configured to jet a plurality of different marking materials (different colors of ink, primers, coatings, etc.) on the print medium 15, 16. Each marking material for use in the printing assembly 7 is stored in one of a plurality of containers arranged in fluid connection with the respective print heads for supplying marking material to the print heads to print an image on the print medium 15, 16.

The ejection of the marking material from the print heads is performed in accordance with data provided in the respective print job. The timing by which the droplets of marking material are released from the print heads determines their position on the print medium 15, 16. The timing may be adjusted based on the position of the inkjet printing assembly 7 along the first guide beam 6. The above mentioned sensor 8 may therein be applied to determine the relative position and/or velocity of the inkjet printing assembly 7 with respect to the print medium 15, 16. Based upon data from the sensor 8, the release timing of the marking material may be adjusted.

Upon ejection of the marking material, some marking material may be spilled and stay on a nozzle surface of the print heads. The marking material present on the nozzle surface, may negatively influence the ejection of droplets and the placement of these droplets on the print medium 15, 16. Therefore, it may be advantageous to remove excess of marking material from the nozzle surface. The excess of marking material may be removed for example by wiping with a wiper and/or by application of a suitable anti-wetting property of the surface, e.g. provided by a coating.

The marking materials may require treatment to properly fixate them on the print medium. Thereto, a fixation unit 10 is provided downstream of the inkjet printing assembly 7. The fixation unit 10 may emit heat and/or radiation to facilitate the marking material fixation process. In the example of FIG. 1, the fixation unit 10 is a radiation emitter, which emits light of certain frequencies, which interacts with the marking materials, for example UV light in case of UV-curable inks. The fixation unit 10 in FIG. 1 is translatable along a second guide beam 9. Other fixation units 10, such as page-wide curing or drying stations may also be applied. Further, the inkjet printing assembly 7 may be provided with a further fixation unit on the same carriage which holds the print heads. This further fixation unit can be used to (partially) cure and/or harden the marking materials, independent of or interaction with the fixation unit 10.

After printing, and optionally fixation, the print medium 15, 16 is transported to a receiving unit (not shown). The receiving unit may comprise a take-up roller for winding up the print medium 15, 16, a receiving tray for supporting sheets of print medium 15, 16, or a rigid media handler, similar to the media input unit 14. Optionally, the receiving unit may comprise processing means for processing the medium 8, 9 after printing, e.g. a post-treatment device such as a coater, a folder, a cutter, or a puncher.

The wide-format printer 1 furthermore comprises a user interface 11 for receiving print jobs and optionally for manipulating print jobs. The local user interface unit 11 is integrated to the print engine and may comprise a display unit and a control panel. Alternatively, the control panel may be integrated in the display unit, for example in the form of a touch-screen control panel. The local user interface unit 11 is connected to a control unit 12 connected to the printer 1. The control unit 12, for example a computer, comprises a processor adapted to issue commands to the printer 1, for example for controlling the print process. The printer 1 may optionally be connected to a network. The connection to the network can be via cable or wireless. The printer 1 may receive printing jobs via the network. Further, optionally, the control unit 12 of the printer 1 may be provided with an input port, such as a USB port, so printing jobs may be sent to the printer 1 via this input port.

Hybrid Printing System

Figure 2:
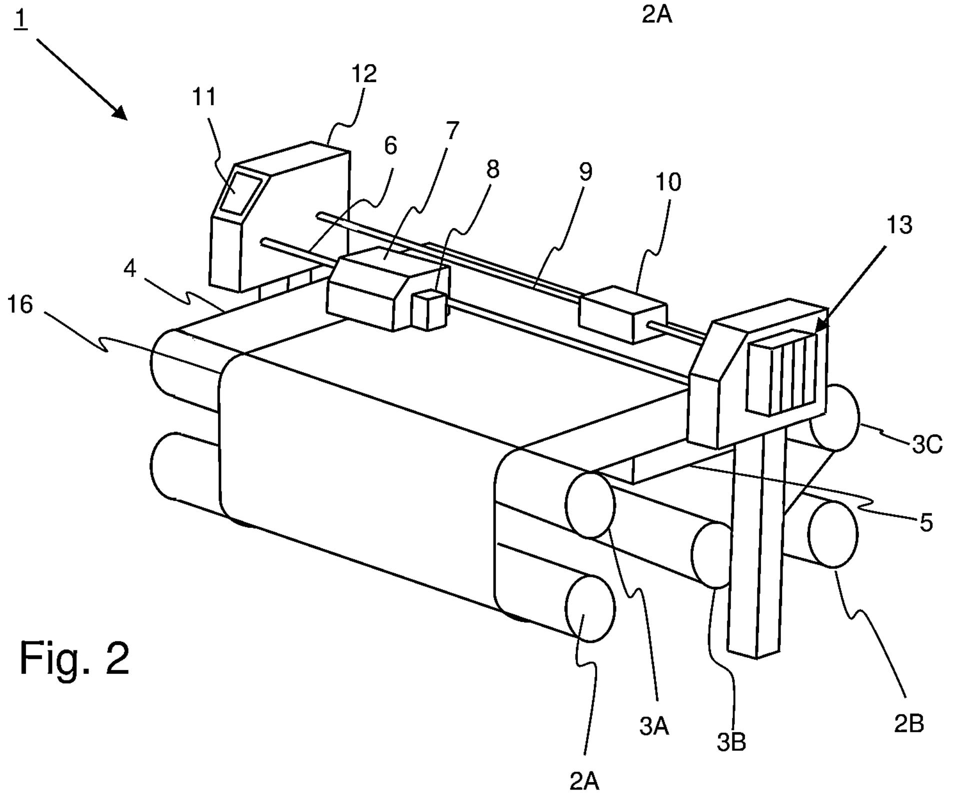
FIG. 2 is a schematic perspective view of a printing system in FIG. 1 in a second printing mode.

The printer 1 in FIG. 1 is a so-called hybrid printer, capable of handling both flexible media and rigid substrates. In FIG. 1, the printer 1 operates in a first print mode, wherein the printer 1 is configured for transporting rigid substrates, such as the print medium 15, 16. Such rigid print media 15, 16 may be panels for doors, walls, etc., corrugated media, plates formed of plastic or metal, etc. To handle these rigid print media 15, 16, the printer 1 in FIG. 1 is configured with a substantially linear transport path: from the media input device 14, the print medium 15, 16 moves forward along the inkjet printing assembly 7 at a at substantially constant height. The media input unit 14 and the receiving unit are positioned at the level of the medium support surface of the belt 4. In FIG. 2, a flexible web medium 16 is supplied to the printer 1, which web medium 16 may be composed of e.g. paper, label stock, coated paper, plastic or textile. The web medium 16 is supplied from the input roller 2A and extends across the belt 4 to the take-up roller 2B, where the web medium 16 is re-wound. The printer 1 is configured to swiftly and efficiently switch between print modes.

Control

Figure 3:
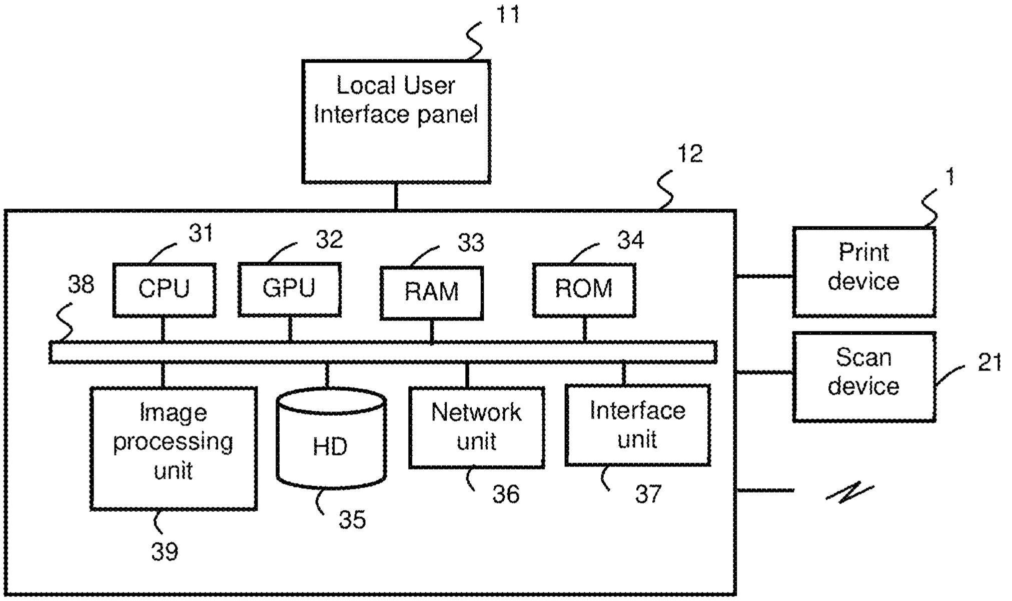
FIG. 3 is a schematic diagram of a control unit of a printer according to FIG. 1 or 2.

An embodiment of the control unit 12 is in more detail presented in FIG. 3. As shown in FIG. 3, the control unit 12 comprises a Central Processing Unit (CPU) 31, a Graphical Processor Unit (GPU) 32, a Random Access Memory (RAM) 33, a Read Only Memory (ROM) 34, a network unit 36, an interface unit 37, a hard disk (HD) 35 and an image processing unit 39 such as a Raster Image Processor (RIP). The aforementioned units 31-37 are interconnected through a bus system 38. However, the control unit 12 may also be a distributed control unit.

The CPU 31 controls the printing system 1 in accordance with control programs stored in the ROM 34 or on the HD 35 and the local user interface panel 5. The CPU 31 also controls the image processing unit 34 and the GPU 32. The ROM 34 stores programs and data such as boot program, set-up program, various set-up data or the like, which are to be read out and executed by the CPU 31. The hard disk 35 is an example of a non-volatile storage unit for storing and saving programs and data which make the CPU 31 execute a print process to be described later. The hard disk 35 also comprises an area for saving the data of externally submitted print jobs. The programs and data on the HD 35 are read out onto the RAM 33 by the CPU 31 as needed. The RAM 33 has an area for temporarily storing the programs and data read out from the ROM 34 and HD 35 by the CPU 31, and a work area which is used by the CPU 31 to execute various processes. The interface unit 37 connects the control unit 12 to the client devices 21-24 and to the printing system 1. The network unit 36 connects the control unit 12 to the network N and is designed to provide communication with the workstations 22-24, and with other devices 21 reachable via the network N. The image processing unit 39 may be implemented as a software component running on an operation system of the control unit 12 or as a firmware program, for example embodied in a field-programmable gate array (FPGA) or an application-specific integrated circuit (ASIC). The image processing unit 39 has functions for reading, interpreting and rasterizing the print job data. The print job data contains image data to be printed (i.e. fonts and graphics that describe the content of the document to be printed, described in a Page Description Language or the like), image processing attributes and print settings.

Modular Transport Belt

Figure 4:
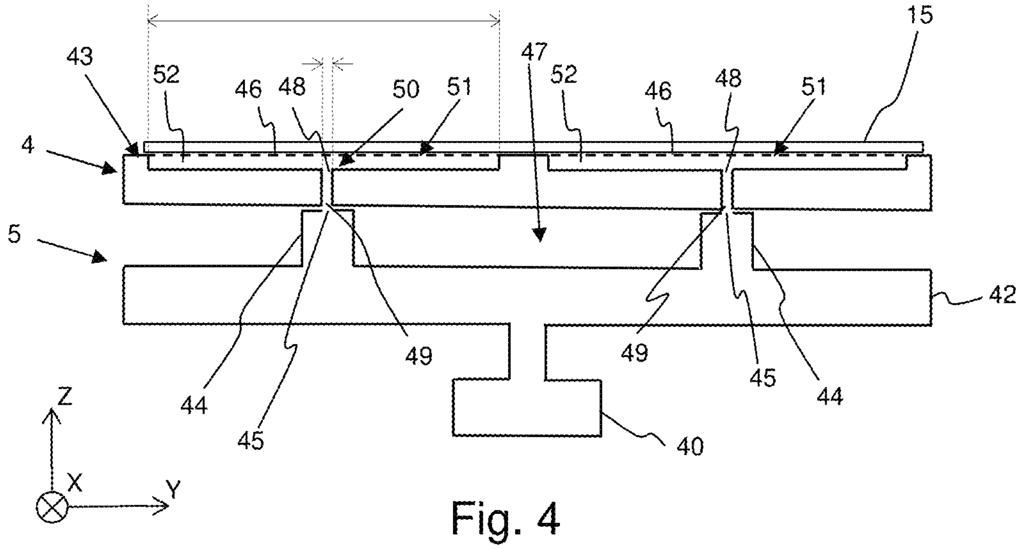
FIG. 4 is a schematic, cross-sectional, frontal view of a transport device of the printer in FIG. 1 or 2.

FIG. 4 shows a cross-section of the belt 4 and the suction box 5. The suction box 5 comprises a main chamber 42 connected to the suction source 40. The suction source 40 may be a fan or pump. The main chamber 42 distributes the underpressure supplied by the suction source 40 over the full width of the suction box 5. On the transport belt side, which is generally the top side, the suction box 5 is provided with protrusions 44. The protrusions 44 are spaced from one another in the lateral direction Y, such that a free or empty space 47 is formed between neighboring protrusions 44. The free space 47 is enclosed in the lateral direction Y by the protrusions and in the height direction Z by the inner surface of the belt 4 and the top surface of the main chamber 42. Each protrusion 44 comprises an inlet opening 45 at its free end. The inlet opening 45 in the top surface of each protrusion 44 faces the inner surface of the belt 4.

The portion of the belt 4 forming the print surface 43 is supported on the top surfaces of the protrusions 44. The top surfaces of the protrusions 44 are aligned, such that these form a single, flat plane in the transport and lateral directions X, Y. The inner surface of the belt 4 is provided with inner openings 49. The inner openings 49 are positioned at the same lateral position as the inlet openings 45 in the protrusions 44. Preferably, the inlet openings 45 and the inner openings 49 have corresponding or similar dimensions in the lateral direction Y. The inner openings 49 connect to a channel 48 locally perpendicular to the plane of the belt 4. The channel 48 connects the inner opening 49 to a distribution chamber 52, which has a significantly greater width than the inner opening 49. The channel 48 and the distribution chamber 52 together form the inner channel structure 50 of the belt 4. The top surface of the distribution chamber 52 is formed by a perforated membrane or layer 46, for example a plastic plate provided with slits or other through-holes to form outer openings 51. The perforated layer 46 forms the print surface 43 upon which the print medium 15 is supported. The underpressure applied via the suction source 40 travels from the suction box 5 into the belt 4 via the connection between the inlet openings 49 and the inner openings 49 of the belt 4. The inner openings 49 form only a relatively small portion of the belt's surface. The distribution chamber 52 ensures that the underpressure is applied to the majority of the print surface 43. Thereby, the print medium 15 is adhered to the belt 4 via the underpressure applied through the air permeable top layer 46 of the distribution chamber 52.

The construction in FIG. 4 allows for a reduced friction between the belt 4 and the suction box 5. The underpressure results in a normal force on the belt 4 which pulls the belt 4 against the suction box 5. The friction force between the suction box 5 and the belt 4 is proportional to this normal force. The normal force is proportional to the total open area of the inner openings 49. The structure in FIG. 4 allows for a relatively small total open area of the inner openings 49, and in consequence a relatively small normal force and thus relatively low friction. Additionally, the contact area between the belt 4 and the suction box 5 is relatively small, since the belt 4 is supported only on the protrusions 44. Since the friction force is also proportional to the contact area, a relatively low friction force is achieved by the construction in FIG. 4.

Figure 5:
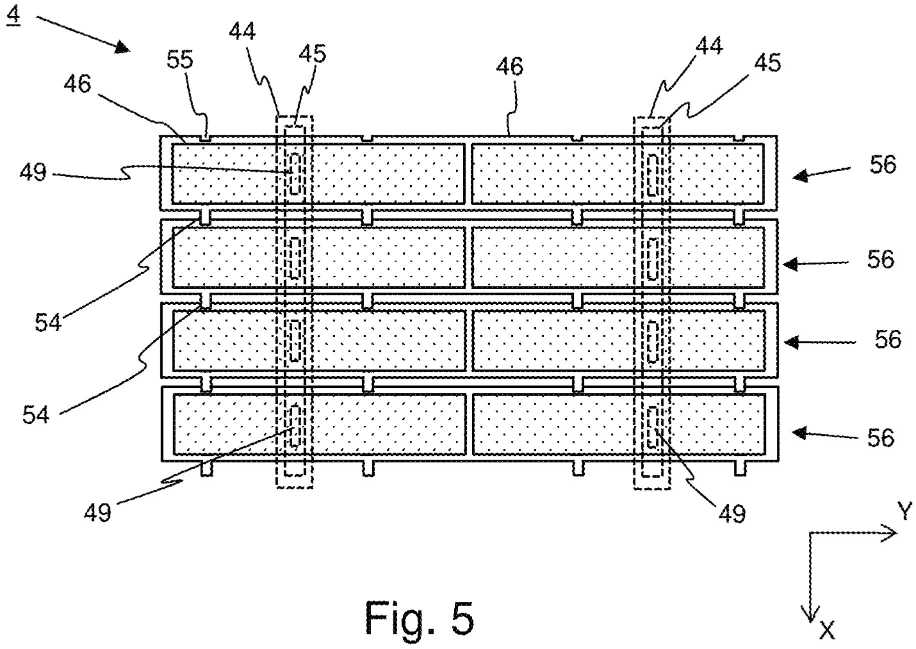
FIG. 5 is a schematic, top-down view of the transport device of the printer in FIG. 1 or 2.

FIG. 5 shows in top-down view the belt 4 from FIG. 4. The belt 4 is a so-called modular belt, formed of a plurality of interlocking segments 56. The segments 56 are moveably connected to one another, such that there segment 56 may pivot with respect to one another to create a curve in belt 4. This allows the belt 4 to turn around the rollers 3A-3C. The interlocking is achieved by means of corresponding pairs of connectors 54, 55, for example locking protrusions 54 and correspondingly dimensioned recesses 55.

FIG. 5 also illustrates the distribution of the underpressure via the distribution chamber 52, which is dimensioned to be wider and preferably longer than each inner opening 49. During transport the inner openings 49 travel over the path defined by the respective inlet opening 45 in the transport direction X. The inlet opening 45 is preferably a continuous opening in the transport direction X. This allows underpressure to travel through the inner openings 45 constantly regardless of their position. This ensures reliable holding of the print medium 15. It will be appreciated that while in FIGS. 4 and 5 only pairs of protrusions 44, inlet openings 49, inner openings 45, and distribution chambers 52 are shown, any suitable plurality of such components may be applied, specifically to prevent local sagging of the belt 4.

Figure 6:
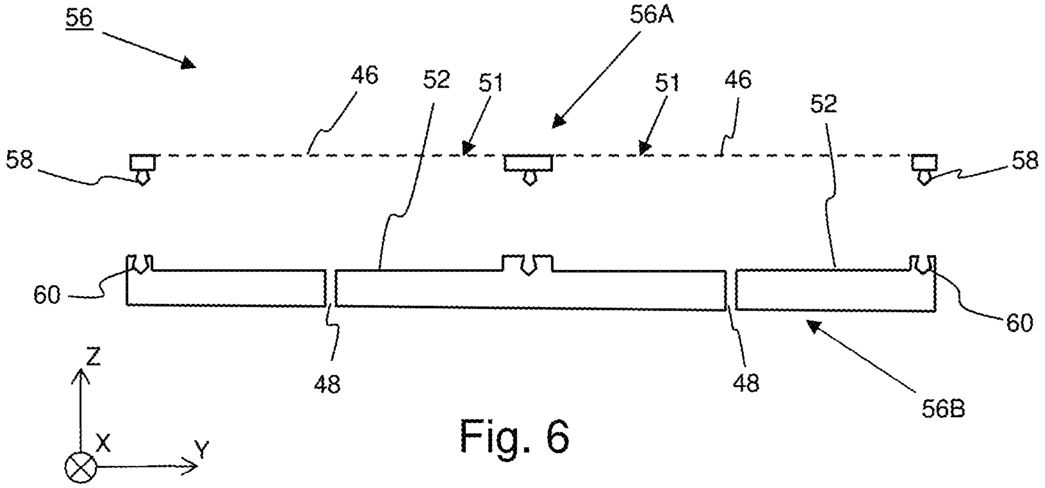
FIG. 6 is a schematic, cross-sectional, exploded view of a segment of the modular belt in FIG. 5.

FIG. 6 illustrates the construction of a segment 52 as shown in FIG. 4. Each segment 52 is formed of a pair of securable parts 56A, 56B. One segment part 56A comprises the print surface 43 with perforated layers 46. Each segment part 56A, 56B is preferably integrally formed, for example by means of injection molding. The perforated layer 46 with its through-holes in FIG. 6 is formed in the same component as the securing members 58. Preferably, the entire segment part 56A is formed of entirely of plastic using a single mold. This allows for a costs effective yet precise manufacturing of such segments 56A. The same applied mutatis mutandis to segment part 56B. The other segment part 56B comprises the channels 48 which are provided as through-holes in the main body of the segment part 56B. Recesses are provided in this segment part 56B for defining the distribution chamber 52. The segment parts 56A, 56B can be secured together by means of corresponding securing members 58, 60, such as clamps, click mechanisms, adhesives, etc. The securing is preferably airtight.

Although specific embodiments of the disclosure are illustrated and described herein, it will be appreciated by those of ordinary skill in the art that a variety of alternate and/or equivalent implementations exist. It should be appreciated that the exemplary embodiment or exemplary embodiments are examples only and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents. Generally, this application is intended to cover any adaptations or variations of the specific embodiments discussed herein.

It will also be appreciated that in this document the terms "comprise", "comprising", "include", "including", "contain", "containing", "have", "having", and any variations thereof, are intended to be understood in an inclusive (i.e. non-exclusive) sense, such that the process, method, device, apparatus or system described herein is not limited to those features or parts or elements or steps recited but may include other elements, features, parts or steps not expressly listed or inherent to such process, method, article, or apparatus. Furthermore, the terms "a" and "an" used herein are intended to be understood as meaning one or more unless explicitly stated otherwise. Moreover, the terms "first", "second", "third", etc. are used merely as labels, and are not intended to impose numerical requirements on or to establish a certain ranking of importance of their objects.

The present disclosure being thus described, it will be obvious that the same may be varied in many ways. Such variations are not to be regarded as a departure from the spirit and scope of the present disclosure, and all such modifications as would be obvious to one skilled in the art are intended to be included within the scope of the following claims.

This application claims the benefit of EP Application No. 22161659.2, filed Mar. 11, 2022, which is hereby incorporated by reference herein in its entirety.

The invention claimed is:

1. A printer comprising:

a transport belt that is air permeable and endless, further defining a transport direction; and a suction box configured to be in fluid connection with a suction source to apply an underpressure to a print medium on the transport belt, wherein the suction box is provided with a plurality of protrusions having free ends that define a support plane for the transport belt and are provided with inlet openings, wherein the transport belt is provided over the suction box and provided with an inner channel structure which connects outer openings on an outer side of the transport belt to inner openings on an inner side of the transport belt, and wherein the inner openings are positioned to align with the inlet openings, and the inner channel structure widens from the inner openings to the outer openings in a lateral direction perpendicular to the transport direction.

2. The printer according to claim 1, wherein the transport belt is a modular belt having a plurality of interlocking segments.

3. The printer according to claim 2, wherein each segment of the plurality of interlocking segments is formed of two parts, one part having an outer opening and the other part having an inner opening, and wherein the inner channel structure is between the outer and inner openings when the two parts are in their assembled state.

4. A printer comprising:

a transport belt that is air permeable and endless; and a suction box configured to be in fluid connection with a suction source to apply an underpressure to a print medium on the transport belt, wherein the suction box is provided with a plurality of protrusions having free ends that define a support plane for the transport belt and are provided with inlet openings, wherein the transport belt is provided over the suction box and provided with an inner channel structure which connects outer openings on an outer side of the transport belt to inner openings on an inner side of the transport belt, wherein the inner openings are positioned to align with the inlet openings, and the inner channel structure widens from the inner openings to the outer openings, and wherein the inner openings have a combined open area that is substantially smaller than a combined open area of the outer openings.

5. The printer according to claim 4, wherein the plurality of protrusions extend in a transport direction of the transport belt and are spaced apart from one another in a lateral direction perpendicular to the transport direction.

6. The printer according to claim 5, wherein a free space is formed between neighboring protrusions in the lateral direction and underneath the transport belt a height direction perpendicular to the transport and lateral directions.

7. The printer according to claim 5, wherein a spacing between neighboring protrusions is greater than a width of the neighboring protrusions in the lateral direction.

8. The printer according to claim 5, wherein a width of the inlet openings or outlet openings in the lateral direction is smaller than a spacing between neighboring protrusions.

9. The printer according to claim 5, wherein each protrusion of the plurality of protrusions is longitudinal in the transport direction and has a length and a width, and wherein the length is multiples times the width in the lateral direction.

10. The printer according to claim 5, further comprising a scanning printhead assembly translatable in the lateral direction.

11. The printer according to claim 10, further comprising a controller configured to control the transport belt to transport the print medium in discrete steps, wherein, to print a swath of an image on the print medium, the scanning printhead assembly translates over the print medium in between the steps.

12. A printer comprising:

a transport belt that is air permeable and endless; and a suction box configured to be in fluid connection with a suction source to apply an underpressure to a print medium on the transport belt, wherein the suction box is provided with a plurality of protrusions having free ends that define a support plane for the transport belt and are provided with inlet openings, wherein the transport belt is provided over the suction box and provided with an inner channel structure which connects outer openings on an outer side of the transport belt to inner openings on an inner side of the transport belt, wherein the inner openings are positioned to align with the inlet openings, and the inner channel structure widens from the inner openings to the outer openings, and wherein each inner opening is dimensioned corresponding to the inlet opening over which the inner opening extends.

* * * * *